United States Patent [19]
Ban et al.

[11] Patent Number: 5,470,461
[45] Date of Patent: Nov. 28, 1995

[54] APPARATUS FOR PRODUCING PURE WATER

[75] Inventors: Cozy Ban; Motonori Yanagi; Takaaki Fukumoto, all of Itami; Toshiki Manabe, Toda; Hiroshi Yanome, Toda; Kazuhiko Kawada, Toda, all of Japan

[73] Assignees: Mitsubishi Denki Kabushiki Kaisha; Japan Organo Co., Ltd, both of Tokyo, Japan

[21] Appl. No.: 955,143

[22] Filed: Oct. 1, 1992

[30]   Foreign Application Priority Data

Oct. 4, 1991 [JP] Japan ..................... 3-257291

[51] Int. Cl.$^6$ .............................................. C02F 9/00
[52] U.S. Cl. ..................... 210/188; 210/199; 210/202; 210/259; 210/266; 210/900
[58] Field of Search .......................... 210/668, 669, 210/681, 685, 686, 748, 760, 202, 259, 266, 900, 664, 188, 199

[56]           References Cited

U.S. PATENT DOCUMENTS

| | | | |
|---|---|---|---|
| 3,197,401 | 7/1965 | Arai | 210/664 |
| 3,458,438 | 7/1969 | Smith et al. | 210/664 |
| 3,870,033 | 3/1975 | Faylor et al. | 210/900 |
| 4,548,716 | 10/1985 | Boeve | 210/668 |
| 4,917,806 | 4/1990 | Matsunaga et al. | 210/662 |
| 5,024,766 | 6/1991 | Mahmud | 210/669 |
| 5,073,268 | 12/1991 | Saito et al. | 210/900 |

FOREIGN PATENT DOCUMENTS 62-39769   2/1987   Japan .

OTHER PUBLICATIONS

Edwards et al., "A Mechanistic Study of Ozone–Induced Particle Destabilization", Research Technology, Journal AWWA, Jun., 1991, pp. 96–105.
Naden, M. Streat, "Ion Exchange Technology", Society of Chemical Industry/Ellis Horwood Ltd., pp. 25–36 (1984).
Ban et al., "A New Purifying Method to Purify DI Water of Colloidal Substances", International Confederation of Contamination Control Societies, (1992), pp. 67–73 and projection sheets.

*Primary Examiner*—Ivars Cintins
*Attorney, Agent, or Firm*—Leydig, Voit & Mayer

[57]           ABSTRACT

An apparatus for producing pure water is provided which includes means for ionizing non-ionic silica which is contained in water comprising a vessel for allowing the water to pass therethrough and stay therein for predetermined lengths of time; means for dissolving ozone in the water in this vessel; means for irradiating the water in which ozone has been dissolved with ultraviolet rays; means for separating gases from liquids located between the means for dissolving ozone and the means for irradiating water; and means for fixing ionized silica in the water to a solid electrolyte by ion exchange.

15 Claims, 9 Drawing Sheets

1

APPARATUS FOR PRODUCING PURE WATER

BACKGROUND OF THE INVENTION

1. Field of the Invention

This invention relates to a method and apparatus for producing pure water and, in particular, to a method and apparatus to be used, lot example, for manufacturing the equipment for producing ultrapure water used for rinsing semiconductor devices and the equipment for producing pure water for making up condensate at fossil-fueled and nuclear power stations, and for preparing pure and ultrapure water used in the pharmaceutical industry.

2. Description of the Related Art

In the manufacture of semiconductor devices, pure water refined to ultra-high purity, i.e., so-called ultrapure water, has conventionally been used for rinsing wafers, etc., which water contains very small quantities of electrolytes, particulates, bacteria or the like. To remove the small quantities of electrolytes, particulates, organic matter, bacteria, etc. contained in pure water, an apparatus for producing ultrapure water generally consists of a combination of systems using ion exchange resins, membrane separation means such as reverse osmosis membranes or ultrafiltration membranes, ultraviolet ray oxidation means, ion exchange polishers, etc. FIG. 9 shows a conventional example of such an apparatus lot producing ultrapure water. In the apparatus shown, the suspended matter in raw water is removed by pre-treatment devices such as a coagulation and sedimentation unit, a filter or the like. Then, most of the elctrolytes, particulates, bacteria, etc. are removed by a deionization device using ion exchange resins, a reverse osmosis device, a vacuum deaerator, an ion exchange mixed-bed ion exchange polisher, etc., which constitute a primary pure water producing system. Trace amounts of impurities remaining in the primary pure water, obtained by the primary pure water producing system, are removed by performing further sterilization and organic matter decomposition on the primary pure water with a secondary pure water producing system, which consists of an ultraviolet ray device (for sterilization and oxidation), an ion exchange polisher, an ultrafiltration membrane, etc. In many cases, the secondary pure water producing system is provided in the vicinity of use points distant from the primary pure water producing system.

In the field of semiconductor device manufacture, ultrapure water, not just pure water, is required because the impurities contained in the wafer-rinsing water has a great influence on the product yield. For example, any particulates, included in the impurities, will remain as evaporation residues causing stains on the wafers, thereby reducing the yield. Thus, to attain an improved yield, further reduction in the amount of impurities in the rinsing water is still required, even in the case of ultrapure water. The increasing degree of integration semiconductor devices as a result of recent remarkable developments of the semiconductor industry has led, for example, to production of 64M DRAMS in addition to the mass production of 4M and 16M DRAMs. As a result, more strict control is being required for the permissible values (in terms of number and size) regarding the above-mentioned stains (residues) remaining after the rinsing operation. Accordingly, the standard for the quality of ultrapure water has become higher, thus making it necessary to further refine the water to an ultra-high level of purity.

However, it is extremely difficult to remove the very small amount of impurities, in particular, particulates, which are on the order to several ppb or less, out of ultrapure water, a water which has been refined to an extremely high level of purity. Experimentally, it might be possible to remove such impurities. However, in the case of equipment used on an industrial scale, that would be difficult because of the various problems involved. For example, a distillation method or the like cannot be adopted for continuous production of ultrapure water. Further, use of activated carbon as an adsorbent is also undesirable since that would involve the problem of removing the very minute particles released therefrom. Thus, from the industrial point of view, a technique to solve these problems must be realized before the above-mentioned small quantities of impurities can be removed from ultrapure water.

In connection with the inorganic particulates causing evaporation residues of ultrapure water, to which the present inventors have directed special attention, Dr. Marc Edwards and Dr. Mark M. Benjamin have proposed a method according to which colloidal substances are removed by converting them to solid oxide particulates throgh forced oxidation using ozone ("A Mechanistic Study of Ozone-Induced Particle Destabilizatlon", JOURNAL AWWA, 1991). According to the method proposed, ozone is bubbled into pure water, thereby changing the colloidal substances in pure water to minute oxidized particles. As a result, the number of particles removed by an ultrafiltration membrane or the like is increased. The present inventors analyzed pure water which had undergone this processing and ascertained an increase in the amount of minute particles, which could be removed by membrane filtration.

The present inventors prepared ultrapure water by bubbling ozone into pure water and performing ion exchange and membrane processings thereon, and used this ultrapure water for the rinsing of semiconductors, only still to find stains on the wafer surfaces.

An object of the present invention is to make it possible to remove the impurities in ultrapure water, which impurities give rise to stains on the wafer surface. The present inventors conducted an analytical examination in order to identify the substance causing the occurrence of stains, which cannot be prevented by the above-described method, according to which colloidal substances were solidified by oxidation using ozone, and found that it was the non-ionic silica component (colloidal silica) of the colloidal substances that gave rise to the stains.

The silica component of the colloidal substances contained in ultrapure water adversely affects the performance of the semiconducter products, as pointed out, for example, in Japanese Patent Laid-Open No. 62-39769. Thus, in the conventional pure water producing apparatus shown in FIG. 9, the non-ionic particulates are removed as much as possible by membrane separation (RO or the like), and the ionic silica component is removed by an ion exchange resin through a mixed-bed ion exchange polisher. However, as shown in FIG. 7, there is no proper method of completely removing the non-ionic silica component, which is allowed to pass through the membrane, such as a reverse osmosis membrane, and through the ion exchange resin. In FIG. 7, the shadowed sections of the graph represent the concentration of the ionic silica component, and the remaining blank sections of the graph represent the concentration of the colloidal silica component.

Silica concentration in ultrapure water is generally measured in accordance with JIS-K0101. That is, the ionic silica dissolved in water is allowed to react in an acidic region with ammonium molybdate to generate molybdenum yellow, which is reduced to molybdenum blue and, by measuring the absorbance of this molybdenum blue, the silica is detected. However, as can be seen from the above description, detection of the silica is only possible when the silica exists in the water as ions. Non-ionic silica generates no molybdenum blue. Thus, to measure the non-ionic silica, it is necessary to convert it to ionic silica.

To examine the behavior of silica in water, the present inventors measured the concentrations of ionic and non-ionic silica components contained in water which has undergone the above-described process, in which colloidal substances were changed to minute solid oxide particles by forced oxidation using ozone, and the concentrations of ionic and non-ionic silica components contained in water which has undergone no such process. FIG. 8 shows the results of the measurement. As shown in the drawing, of the total silica ①, the ionic silica component ② contained in raw water was hardly increased even by ozone bubbling, so that there was substantially no reduction in the concentration of the non-ionic silica. In the graph of FIG. 8, section ③ represents ionic silica contained in raw water which has undergone only ozone bubbling; section ④ represents ionic silica contained in water which has undergone ozone bubbling and then ultraviolet irradiation; and section ⑤ represents ionic silica contained in raw water which has undergone ultraviolet irradiation while undergoing ozone bubbling.

It was found through the above measurement that the non-ionic silica component in pure water could not be removed by the above-described method, according to which colloidal substances were removed by changing them to minute solid particles by forced oxidation, No attempt has been made, in the production of ultrapure water, to ionize the non-ionic silica component contained in water and to remove it by an ion exchange resin. According to the known method described in JIS-K0101 (or Japanese Patent Laid-Open No. 62-39769), the non-ionic silica component contained in water is ionized by adding sodium hydrogen carbonate to the water and by boiling the same. However, although the above-described method can be utilized for analysis and measurement purposes, it cannot be applied to industrial equipment for continuously producing ultrapure water because it requires a boiling process, etc.

The present inventors have assiduously investigated the possibility of providing a method of removing the non-ionic silica component in ultrapure water which can be applied to industrial equipment for producing ultrapure water and found, during the course of this investigation, that although the non-ionic silica component in ultrapure water could not be solidified into particulates even by ozone bubbling and, consequently, could not be removed, it could be ionized by allowing it to react with the ozone in the water under particular conditions (in terms of concentraiton and time) and by performing, at the same time, ultraviolet irradiation thereon. That is, in addition to the above examination described with reference to section ③ of FIG. 8, the present inventors dissolved ozone, in different concentrations, in water containing a non-ionic silica component to effect a reaction for a predetermined length of time and carried out ultraviolet irradiation afterwards or simultaneously, (Refer to sections ⑤ and ⑥ of FIG. 8, respectively.) and measured the concentration of the ionic silica. As a result, it was found that the ionic silica concentration had substantially increased. This processing method can be easily incorporated in a part of equipment for producing pure water or ultrapure water, with the result that an industrial apparatus for continuously producing pure water or ultrapure water can be realized.

SUMMARY OF THE INVENTION

The present invention has been made on the basis of the above finding. It is an object of this invention to provide a novel method of producing pure (or ultrapure) water which, in the production of pure water or ultrapure water on an industrial scale, can reduce as much as possible the non-ionic silica component in the produced pure (or ultrapure) water and preferably reduce it substantially to zero.

Another object of this invention is to provide an apparatus for producing pure (or ultrapure) water on an industrial scale which is suitable for producing pure (or ultrapure) water in which practically no non-ionic silica component exists.

Still another object of this invention is to provide ultrapure water, which water is valuable as it can be utilized as ultrapure rinse water for use in the field semiconductor manufacturing.

In order to achieve the above objects, according to one aspect of the present invention, there is provided a method of producing pure water comprising the steps of;

ionizing a non-ionic silica component which is contained in water and which does not react unmodified with ammonium molybdate reagent; and removing the ionized silica component from the water by causing it to be absorbed onto a solid electrolyte.

According to another aspect of the present invention, there is provided an apparatus for producing pure water comprising:

means for ionizing a non-ionic silica component which is contained in water and which does not react unmodified with ammonium molybdate reagent and means for fixing the ionized silica component in the water to a solid electrolyte by ion exchange.

DESCRIPTION OF THE PREFERRED EMBODIMENTS

Figure 1:
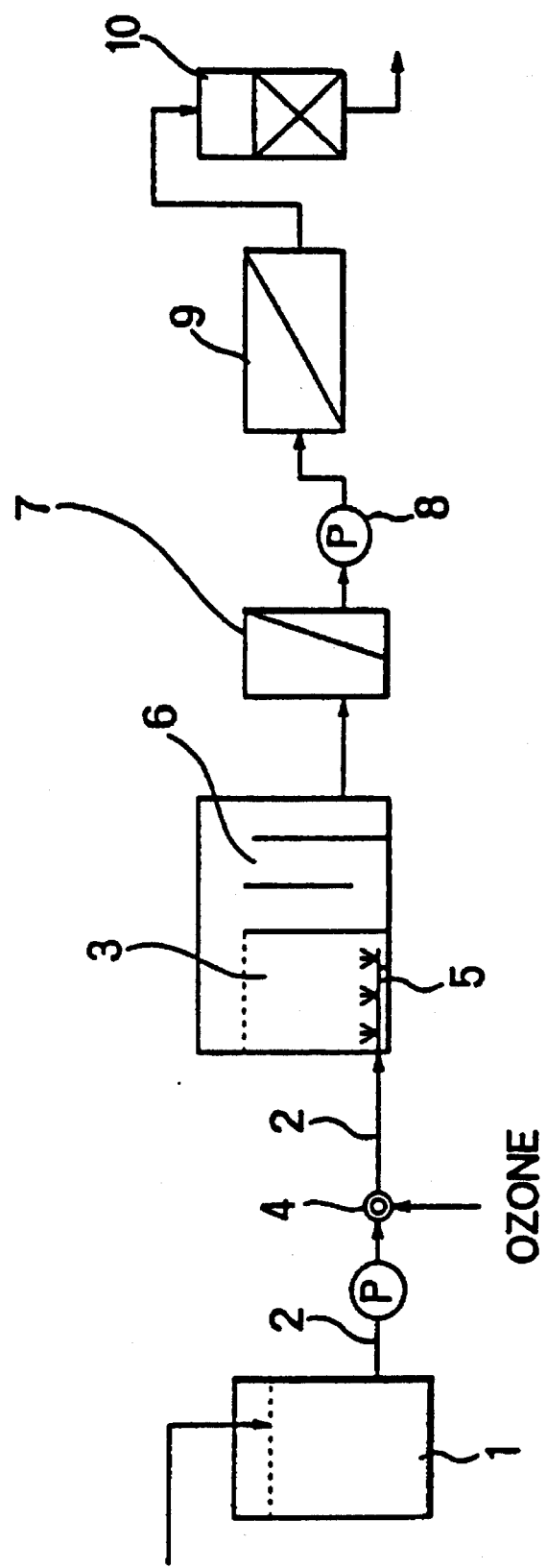
FIG. 1 is a schematic flow diagram showing an example of the construction of ultrapure water producing equipment with an apparatus for removing a non-ionic silica component incorporated in the primary system thereof.

This invention will be described as applied to the electronic industry which manufactures semiconductor devices, etc.

The pure water producing method of the present invention comprises the steps of: ionizing a non-ionic silica component which is contained in water and which does not react, unmodified, with ammonium molybdate reagent; and removing the ionized silica component from the water by causing it to be absorbed onto a solid electrolyte. Specifically, the non-ionic silica component is ionized by bringing it into contact with ozone to cause it to react therewith and, further, by irradiating the silica component with ultraviolet rays simultaneously with or after the step of bringing it into contact with ozone.

In the method of this invention, the conditions for causing contact-reaction between the non-ionic silica and ozone are important. It is expedient to continue the reaction for twenty minutes or more, and more preferably, for forty minutes or more while keeping the ozone concentration of the water containing the silica component at 0.5 ppm or more, more preferably, at 1 ppm or more, and most preferably, at 3 to 4 ppm, stirring the water as needed. If the ozone concentration is less than 0.5 ppm, the non-ionic silica component cannot be ionized to a satisfactory degree even when the ultraviolet irradiation described below is performed at the same time. Similarly, a reaction time of less than twenty minutes will result in an insufficient ionization of the silica component.

For the method of this invention, ultraviolet irradiation of the silica component in water whose ozone concentration is kept at a level as specified above, is indispensable. The non-ionic silica component can be effectively ionized only when such ultraviolet irradiation is performed.

The objects of this invention cannot be achieved by using activated carbon or a reducing agent, such as sodium bisulfate, which is used for the purpose of decompositng any remaining ozone in the prior-art technique, in which a colloidal substance is solidified into minute particulates.

There is no particular limitation regarding the ultraviolet rays used in the present invention. The method of this invention can be effectively executed by using what is generally called ultraviolet lamps, such for example as lamps emitting light having a wavelength usually ranging from 170 to 400 nm). The ultraviolet irradiation is effected to a degree high enough to decompose the ozone dissolved in the water in the concentration as specified above.

The pure water producing apparatus of this invention is formed by providing in the production line thereof a means for ionizing a non-ionic silica component and a means for fixing the ionized silica component in the water to a solid electrolyte by ion exchange, for example, a column of an ion exchange resin. In the case of an apparatus for producing ultrapure water, it is desirable that the above components be provided in a primary pure water production system. The solid electrolyte as used for the present invention includes any of the inorganic and organic ion exchangers in the bead, pulverized, powder or fiber form. A preferable example of such ion exchanger is a strongly basic anion exchange resin manufactured for example by introducing quaternary ammonium exchange radicals to a copolymer of styrene and divinyl benzene.

The above-mentioned means for ionizing a non-ionic silica component comprises, for example: a vessel for allowing water to pass therethrough and stay therein for predetermined lengths of time (an ozone reaction vessel); a means for dissolving ozone in the water in this vessel in such a way that the ozone concentration in this water is kept above a fixed level; a means for performing ultraviolet irradiation on the water in which ozone has been dissolved; and, if necessary, a means for stirring the water in the ozone reaction vessel. There is no particular limitation regarding the means for dissolving ozone. For example, it is possible to effect gas-liquid mixing by providing an ejector, atomizer, turbine, mixer or the like on the line for feeding water into the vessel. There is no particular limitation regarding the above vessel. A typical example of the vessel is one in which feed water is allowed to enter from below while effecting ozone aeration from below and in which the ozonized water is caused to flow from above to the next stage in an overflow system. If there is the possibility of bubbles being mixed in the water as a result of the ozone aeration, it is desirable to provide a gas-liquid separation vessel between the ozone aeration vessel and the ultraviolet irradiation device so that the efficiency of the ultraviolet irradiation in the next step may be enhanced.

When providing the pure water producing appratus of this invention in a primary pure water production system, it is possible to couple the apprartus with a multiple-bed ion exchange pure water producing apparatus used in the primary pure water production system, as described in detail below with reference to an embodiment. A typical example of the multiple-bed ion exchange pure water producing apparatus is so-called two-bed (with a degasifier) pure water producing apparatus which comprises a combination of a cation column filled with a strongly acidic cation exchange resin, a decarbonation (degasifier) column, and an anion column filled with a strongly basic anion exchange resin. In the apparatus, raw water is first passed through the cation column to exchange impurity cations contained in the raw water for hydrogen ions, thereby generating mineral acids (HCl, $HNO_3$, $H_2SO_4$, etc.), carbonic acid ($H_2CO_3$), and silicic acids ($H_2SiO_3$, etc.). Of the above acids, the carbonic acid is removed by physical means in the decarbonation column, and then the mineral acids and the silicic acids are removed by the anion column.

The decarbonation column is composed of a packed column filled with a filler material such as Raschig rings, tellerette packings or the like and a decarbonation water tank provided therebelow. The water processed by the cation column is allowed to enter the decarbonation unit from the upper section of the packed column, and a gas such as air is introduced from the lower section of the packed column by means of a blower to effect gas-liquid contact therein so as to discharge the carbonic acid contained in the cation column-processed water as carbon dioxide gas, allowing the decarbonated water to stay in the decarbonation water vessel. By removing the carbonic acid contained in the cation column-processed water, the ionic load on the subsequent anion column is reduced.

In the following, the present invention will be described in more detail with reference to specific examples.

EXAMPLE 1

Figure 9:
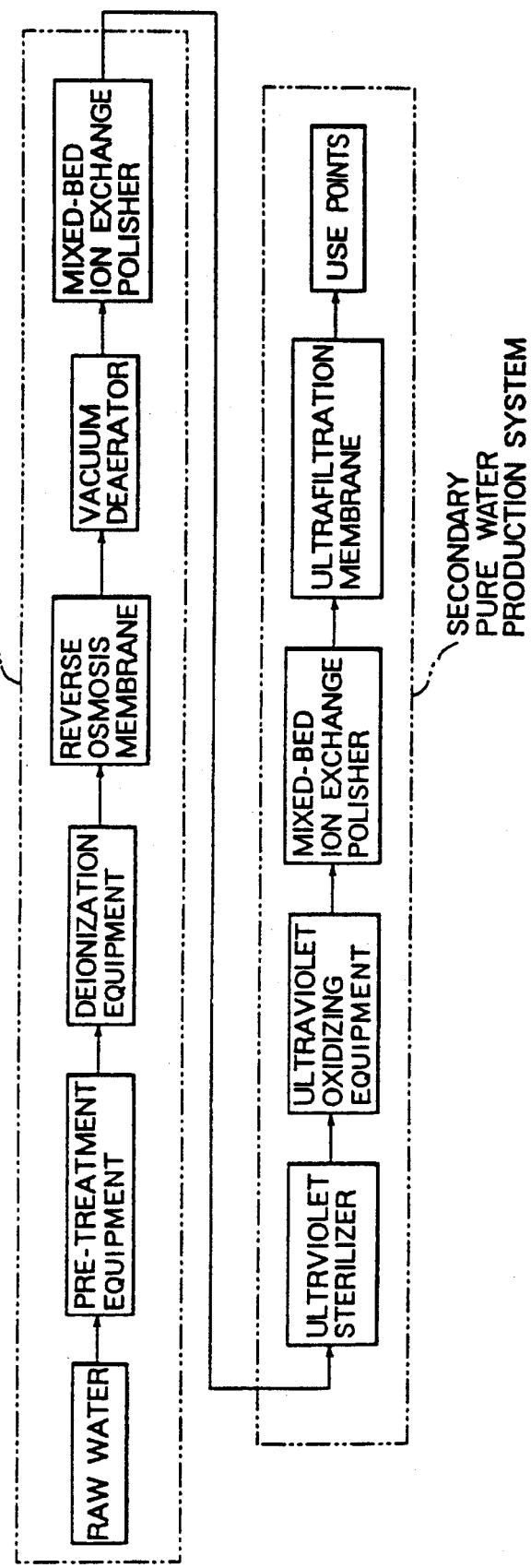
FIG. 9 is a schematic flow diagram showing a conventional example of the construciton of an ultrapure water producing apparatus.

FIG. 1 is a schematic diagram showing a part of the construction of an ultrapure water producing apparatus to which the present invention is applied. In the example shown, an apparatus for removing a non-ionic silica component is incorporated in the primary pure water production system of the conventional ultrapure water producing apparatus shown in FIG. 9.

In the construction of FIG. 1, which includes an apparatus for removing a non-ionic silica component which is provided in the primary system of ultrapure water producing equipment, feed water (water from which the non-ionic silica component has not been removed yet) is conveyed from a feed water tank 1 through a feed water feeding pipe 2 to a reaction vessel 3, by a pump P. Provided in the feed water feeding pipe 2 is an ejector 4 formed of an acid-proof and ozone-proof material. Due to the aspirator action of this ejector, ozone is sucked in, thereby effecting an efficient gas-liquid mixing.

The feed water in which ozone has been dissolved is supplied from below to the reaction vessel 3 formed of an acid resistant and ozone resistant material, whereby ozone aeration is effected by diffusion pipes 5 provided at the bottom of the vessel, thereby keeping the ozone concentration in the reaction vessel 3 above a fixed level. In the apparatus of this example, it is expedient to perform a combined precision electro-polishing on the inner surfaces of the reaction vessel 3 and the diffusion pipes 5, thereby preventing particulate contamination.

The processed water which has undergone the ozone aeration is led to a gas-liquid separation vessel 6 to undergo gas-liquid separation, and is further passed through an ultraviolet irradiation device 7. Then, it is conveyed by a dust-free pump 8 (e.g., one manufactured by Nikuni Kikai Kogyo) to a membrane device 9 (e.g., a reverse osmosis membrane manufactured by Nitto Denko) to undergo membrane separation and is processed by a mixed-bed ion exchange column 10 charged with a strongly acidic cation exchange resin and a strongly basic anion exchange resin. Non-ionic silica in feed water is thus converted into ionic silica which is in turn removed on the strongly basic anion exchange resin in the mixed-bed ion exchange column 10.

EXAMPLE 2

Figure 2:
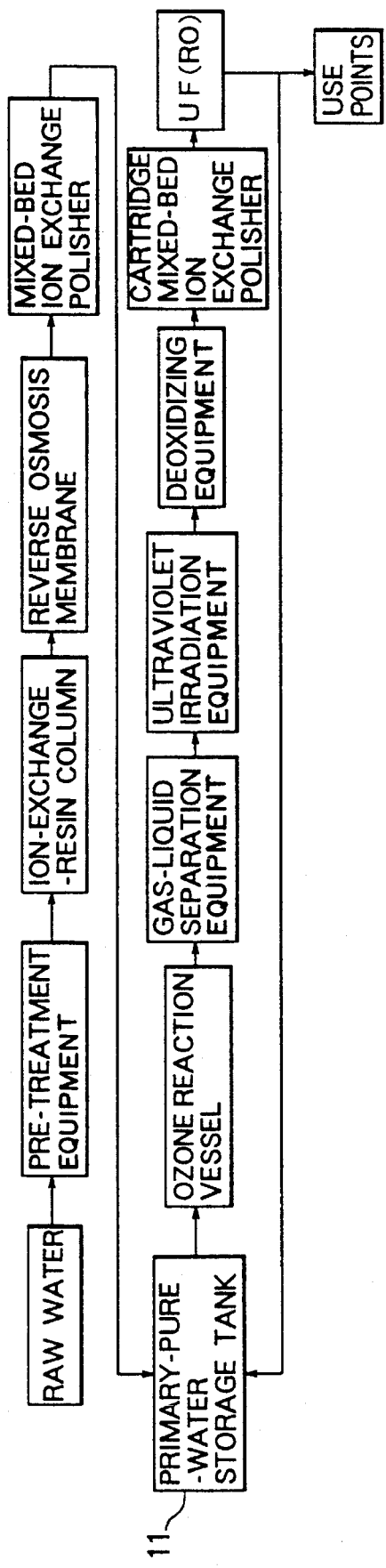
FIG. 2 is a schematic flow diagram showing an example of the construction of ultrapure water producing equipment with an apparatus for removing a non-ionic silica component incorporated in the secondary system thereof.

FIG. 2 shows a typical example of a pure water producing apparatus whose secondary pure water production system includes a mechanism for removing a non-ionic silica component, which mechanism constitutes the features of the present invention. In the primary pure water production system of the example shown, raw water is passed through a pre-treatment device, an ion exchange resin column, a reverse osmosis membrane unit, and a mixed-bed ion exchange polisher, thereby producing primary pure water, which is stored in a primary pure water storage tank 11. Then, the primary pure water is passed through processing devices for ozone reaction, gas-liquid separation and ultraviolet irradiation, which constitute the mechanism for converting non-ionic silica into ionic silica as shown in FIG. 1. After that, the water is passed through a deoxidizing device (e.g., a vacuum deaerator, palladium resin column or nitrogen deaerator), and is further passed through a cartridge mixed-bed ion exchange polisher charged with a strongly acidic cation exchange resin and a strongly basic anion exchange resin and a membrane separation means (UF, RO) and supplied to use points. Any surplus ultrapure water is returned to the storage tank 11.

A test example will be described in which ultrapure water almost totally free from non-ionic silica was produced by the apparatus of this invention shown in FIG. 1.

TEST EXAMPLE 1

Reaction Vessel

Ultrapure water was produced by the apparatus of FIG. 1 under the following conditions: the amount of feed water (deionized water): 250 lit./hr.; the capacity of the reaction vessel: 1 $m^3$ (500 liters in the deaeration vessel, and 500 liters in the gas-liquid separation vessel, so that the reaction time was two hours).

Amount of Ozone Injected

Concentration of the injected ozone: 104 g/$Nm^3$
Amount of ozone injected: 4 ml/min.
The ozone concentration at the outlet of the reaction vessel during the production process fluctuated between 2.5 and 3 ppm.

Measurement of the Silica Components

Figure 3:
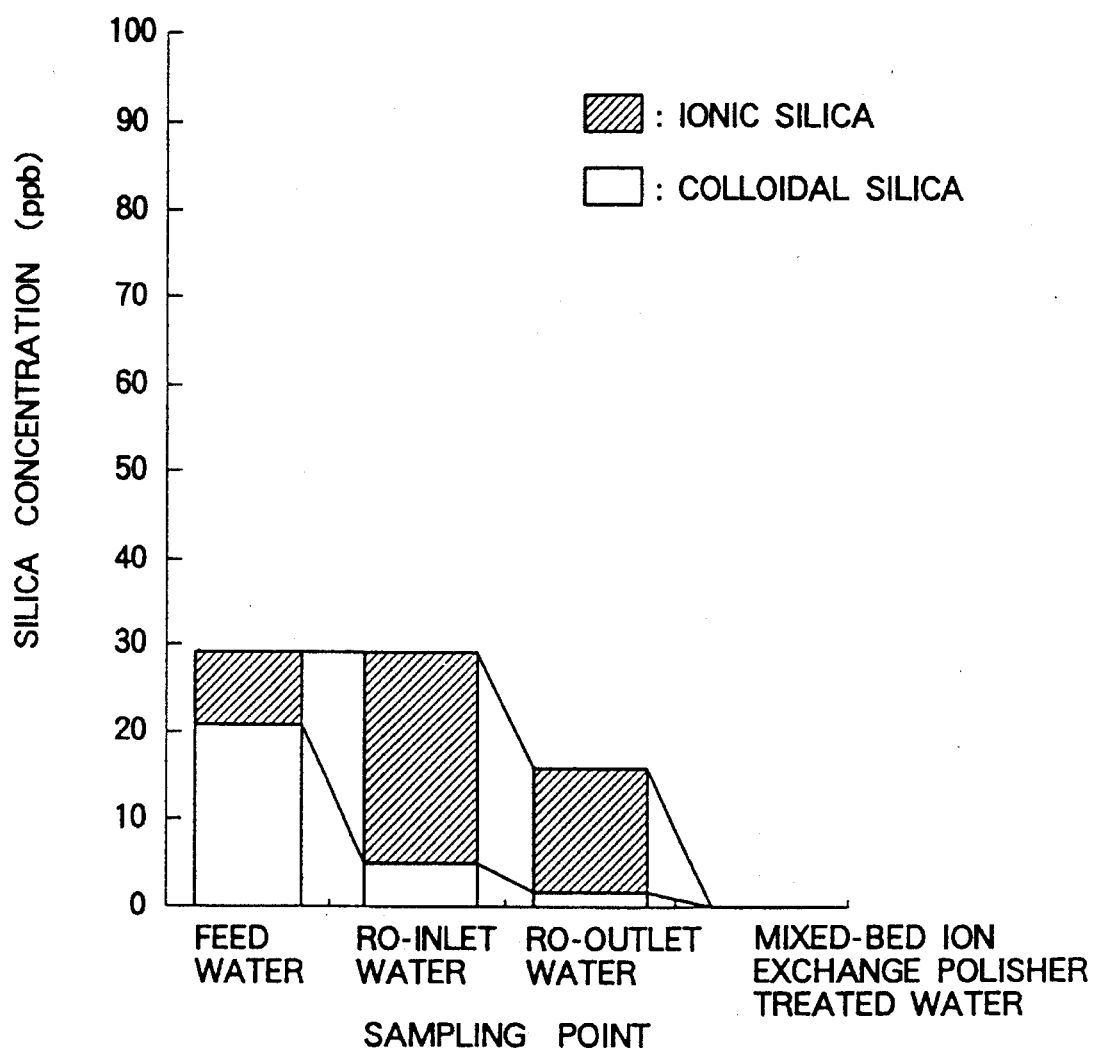
FIG. 3 is a chart showing the results of an experiment in which a non-ionic silica component in water was removed by the apparatus shown in FIG. 1.

The water from the outlet of the reaction vessel 3 was passed through an ultraviolet irradiation device (manufactured by Chiyoda Kohan; wavelength: 254 nm; sterilizing capacity: 1 $m^3$/hr.; and irradiation dosage: 30 W·hr./$m^3$). Then, the water was passed through a membrane separation device (a reverse osmosis membrane, manufactured by Nitto Denko) by a dust-free pump (manufactured by Nikuni Kikai Kogyo). The silica components contained in the water prepared in this way and those contained in water obtained by further passing this water through a mixed-bed ion exchange resin column were measured by an induction-coupling plasma mass spectrograph (manufactured by Yokogawa Denki). The results of the measurement are shown in FIG. 3 and Table 1. FIG. 3 is a graph showing the variation in silica concentration when ozone is injected. In FIG. 3, the shadowed sections represent the concentration of the ionic silica component, and the remaining blank sections represent the concentration of the colloidal silica component.

TABLE 1

|  | Total silica concentration (ICP-MS measured value) | Colloidal silica concentration | Ionic silica concentration (values measured by silica monitor) |
| --- | --- | --- | --- |
| Raw water | 28.92 | 21.54 | 7.38 |
| RO-inlet water | 28.92 | 6.20 | 22.72 |
|  | 28.92 | 21.54 | 7.38 |
| RO-outlet water | 15.14 | 3.71 | 11.34 |
|  | 12.41 | 8.03 | 4.38 |
| MBP-processed water | 1.48 | 1.48 | 0 |
|  | 7.97 | 7.97 | 0 |

The figures in the table are in the unit of μg ($SiO_2$/lit.). The figures in the upper rows indicate the silica concentrations when ozone is injected, and those in the lower rows indicate the silica concentrations when no ozone is injected.

For comparison, a similar measurement was performed on water which had undergone no ozonation (but had undergone ultraviolet irradiation as in the above case), and the results of the measurement are also given in Table 1.

EXAMPLE 3

In this example, the present invention is combined with a two-bed ion exchange pure water producing apparatus. The flow diagram of FIG. 4 shows an example of the combination.

Figure 4:
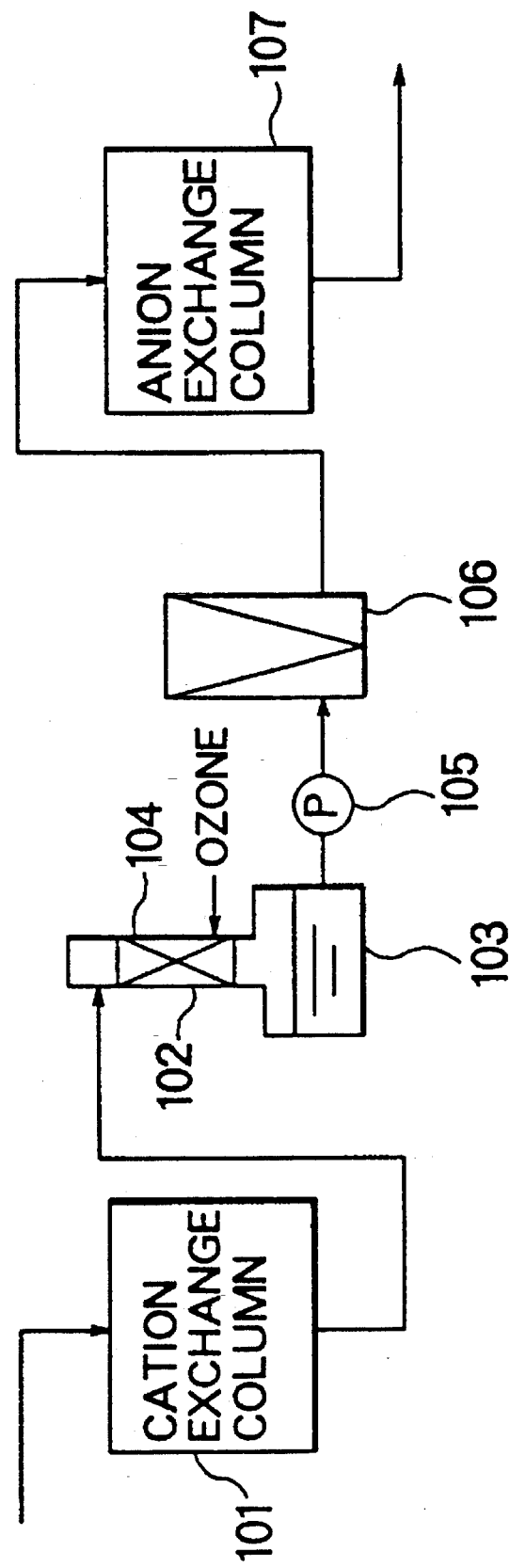
FIG. 4 is a schematic flow diagram showing an example of the construction of a two-bed ion exchange pure water producing apparatus with an apparatus for removing a non-ionic silica component incorporated therein.

Referring to FIG. 4, numeral 101 indicates a cation column filled with a strongly acidic cation exchange resin, and numeral 104 indicates a decarbonation device consisting of a packed column 102 and a decarbonated water tank 103. The water passed through the decarbonation device 104 is caused to flow by a decarbonated water pump 105 through an ultraviolet irradiation device 106 and an anion exchange column 107 filled with a strongly basic anion exchange resin.

The apparatus of this example is characterized by the fact that ozone is allowed to enter from the lower section of the packed column 102 for decarbonation.

That is, decarbonation is effected by causing the water which has been processed by the cation column 101 to undergo gas-liquid contact in the packed column 102, into which ozone is allowed to flow, and, at the same time, ozone is dissolved in the water. Then, contact reaction between the ozone and the decarbonated water is effected within the decarbonation water tank 103. Afterwards, the decarbonated water containing ozone is irradiated with ultraviolet rays by the ultraviolet irradiation device 106, thereby ionizing the non-ionic silica component. Then, ionic silica (anions) inherently existing in the water, the mineral acids, the remaining carbonic acid, etc. can be removed along with the ionized silica component by the anion column 107.

In the above flow of processes, the conditions, such as the ozone concentration in the decarbonation water tank, the contact time and the ultraviolet irradiation, are the same as those mentioned earlier (Test Example 1). In this example, it is possible to perform the ozone reaction simultaneously with the decarbonation.

Further, in the apparatus of this example, an ultraviolet lamp may be incorporated in the decarbonated water tank 103, thereby making it possible to omit the ultraviolet irradiation device 106 and providing an apparatus having a simpler structure.

EXAMPLE 4

Figure 5:
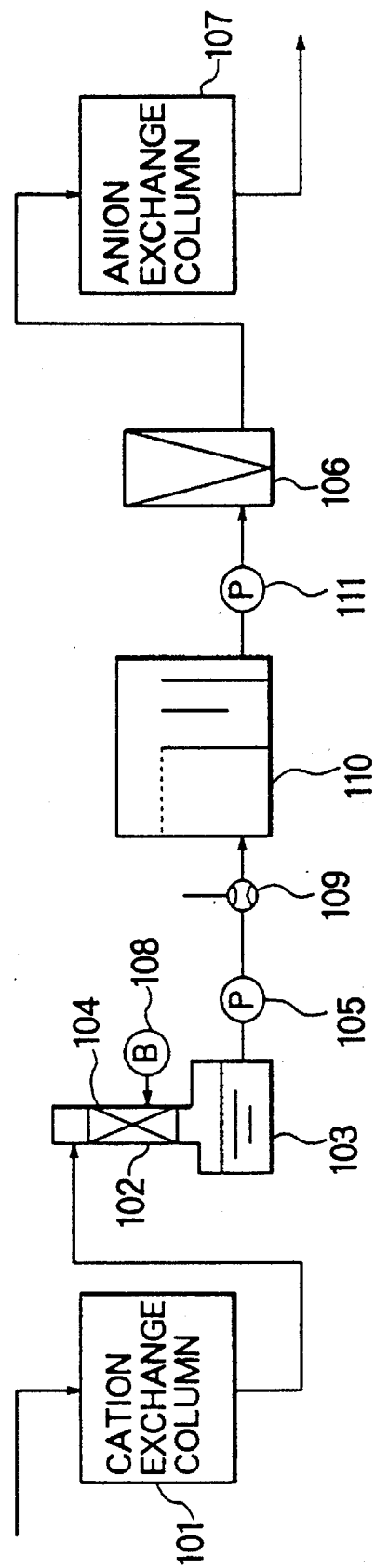
FIG. 5 is a schematic flow diagram showing another example of a two-bed ion exchange pure water producing apparatus with an apparatus for removing a non-ionic silica component incorporated therein.

FIG. 5 shows another example of a construction using a two-bed ion exchange pure water producing apparatus. This example is featured by the provision of a reaction tank 110 and an ultraviolet irradiation device 106 between the decarbonation device 104 and the anion exchange column 107. In the packed column 102 of the decarbonation device 104 of this example, air is introduced by a blower 108, and ozone is injected by an ejector 109 into the decarbonated water discharged by a decarbonated-water pump 105. Then, the decarbonated water is allowed to come into contact and react with the ozone in the reaction tank 110. After that, the same processes as those described with reference to FIG. 4 are conducted. The example shown in FIG. 5 is adopted, for example, when the present invention is incorporated in an existing two-bed ion exchange pure water producing apparatus.

The cation exchange column 101 and the anion exchange column 107 shown in FIGS. 4 and 5 are filled with a strongly acidic cation exchange resin and a strongly basic anion exchange resin, respectively. However, this should not be construed restrictively. Various other forms are possible in the present invention. Regarding the cation exchange column, for example, it may be filled with a weakly acidic cation exchange resin and a strongly acidic cation exchange resin, in a stratiflied bed structure, so that feed water is successively passed through the weakly acidic cation exchange resin and the strongly acidic cation exchange resin. Or, it is also possible to provide two cation columns, filling the first column with a weakly acidic cation exchange resin and the second column with a strongly acidic cation exchange resin, so that feed water is successively passed through the weakly acidic cation exchange resin and the strongly acidic cation exchange resin. Similarly, the anion exchange column may be filled with a weakly basic anion exchange resin and a strongly basic anion exchange resin, in a stratified bed structure, so that feed water is successively passed through the weakly basic anion exchange resin and the strongly basic anion exchange resin. Or, it is also possible to provide two anion exchange columns, filling the first column with a weakly basic anion exchange resin and the second column with a strongly basic anion exchange resin, so that water is successively passed through the weakly basic anion exchange resin and the strongly basic anion exchange resin.

Further, regarding the mode of regenerating the ion exchange resins, it is possible to adopt a concurrent flow regeneration method in which the regenerant is fed in the same direction as the passing of feed water or a counter flow regeneration me%hod in which the regenerant is fed in the direction opposite to the passing of water.

EXAMPLE 5

Figure 6:
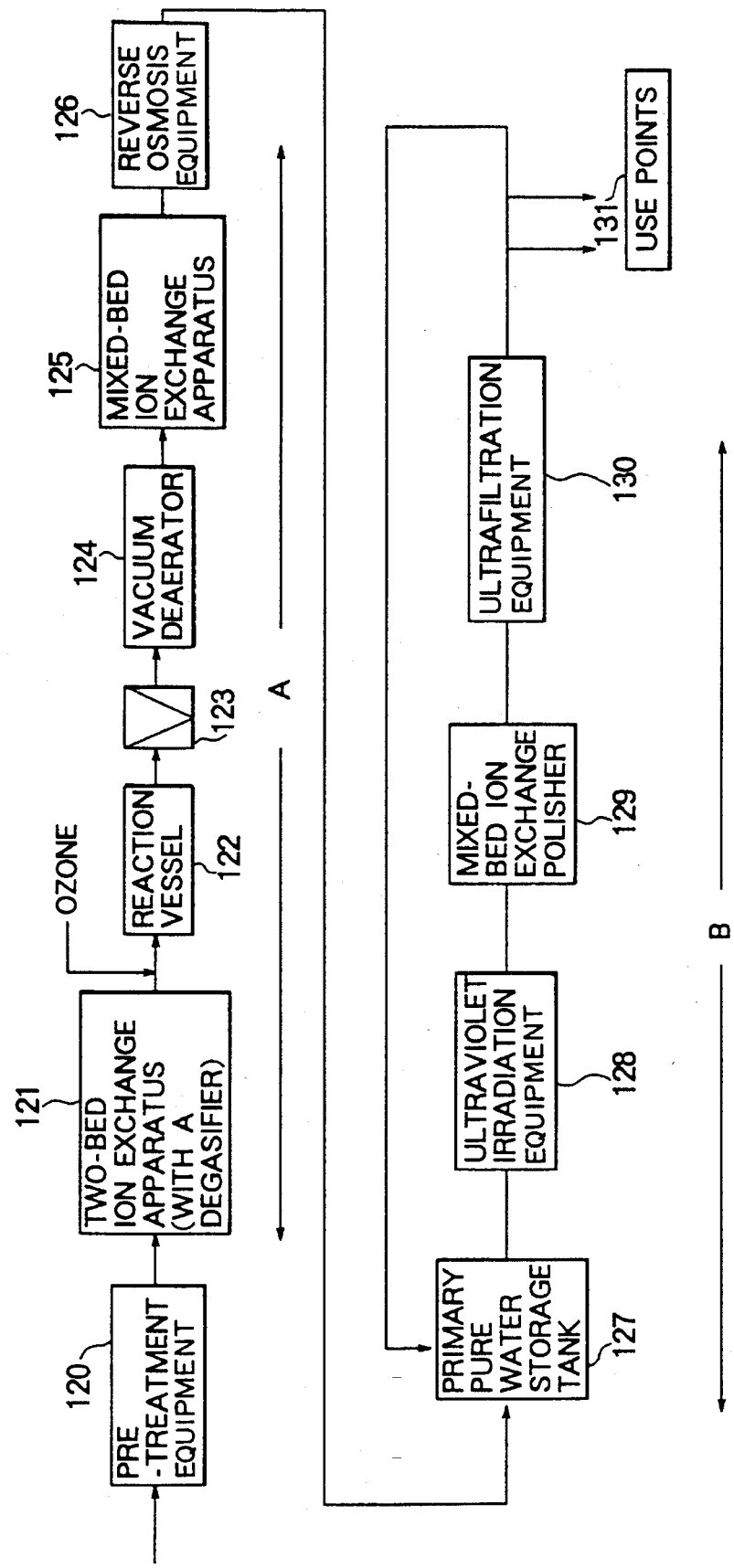
FIG. 6 is a schematic flow diagram showing an example of the construction of ultrapure water producing equipment with an apparatus for removing a non-ionic silica component incorporated in the primary system thereof.
Figure 7:
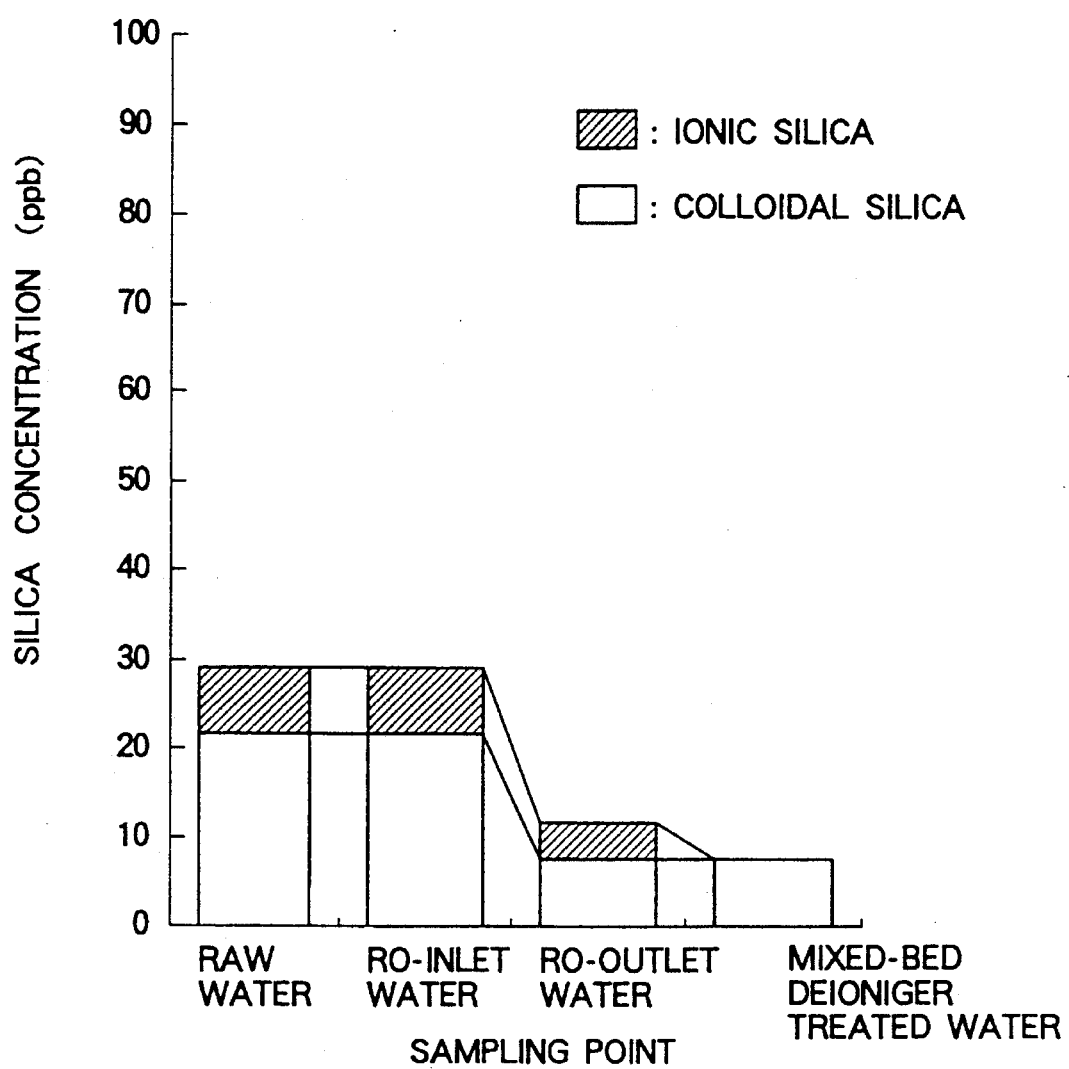
FIG. 7 is a chart showing variation in the concentration of silica contained in pure water produced by a conventional method of producing pure water.
Figure 8:
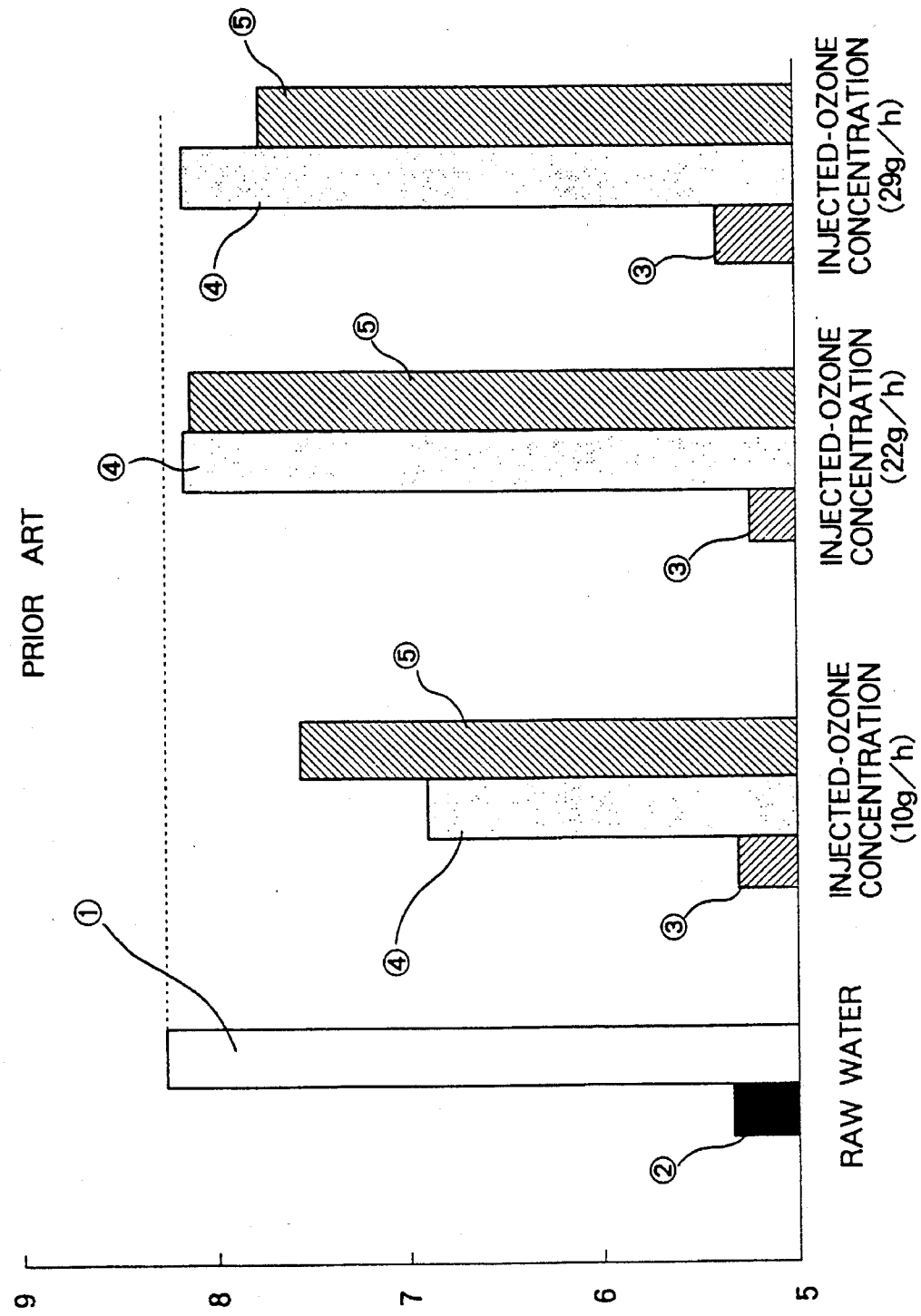
FIG. 8 is a chart showing the results of an investigation indicating that that the proportion of ionization of silica component in water varies depending upon the conditions of ozone processing and ultraviolet irradiation.

Although the present invention has been described with reference to FIGS. 4 and 5 as applied to a two-bed ion exchange pure water producing apparatus used in a primary pure water production sytem, it is also possible to adopt the flow of processes shown in FIG. 6 when incorporating the present invention in the primary pure water production system of an ultrapure water producing apparatus.

In this flow of processes, raw water is processed by a pre-treatment device 120, such as a coagulation and sedimentation unit, and a filter, or an in-line coagulation and filtration unit which effects filtration while adding a coagulant to the raw water, thereby mainly removing the suspended matter from the raw water. After that, deionized water is produced by a two-bed ion exchange pure water producing apparatus 121 with a degasifier. Subsequently, ozone is added to the deionized water and reaction therebetween is effected in a reaction vessel 122. Then, an ultraviolet irradiation device 123 ionizes the non-ionic silica component contained in the processed water of the two-bed ion exchange pure water producing apparatus 121.

Next, any remaining gas dissolved in the water, such as oxygen, is removed by a vacuum deaerator 124, and then the ionized silica and the remaining ions thereof are removed by a mixed-bed ion exchange pure water producing apparatus 125. Then, the water is further processed by a reverse osmosis device 126 to produce primary pure water. The series of devices from the pre-treatment device 120 to the reverse osmosis device 126 constitute a primary pure water production system A.

The primary pure water produced in this way is transferred to a primary pure water storage tank 127, and is then processed by a secondary pure water production system B (sub-system) described below.

In the secondary system, the primary pure water is processed by an ultraviolet irradiation device 128 using ultraviolet lamps adapted to emit light havng a wavelength of around 180 nm, thereby decomposing the trace amounts of remaining organic matter through oxidation. Then, the water is processed by a mixed-bed ion exchange polisher 129 and an ultrafiltration device 130, thereby producing ultrapure water. The ultrapure water obtained is used at use points 131 as needed, with any remaining portion of ultrapure water being returned to the primary pure water storage vessel 127.

Thus, with the method of this invention, it is possible to produce, on an industrial scale, pure (ultrapure water) which contains a substantially reduced amount of non-ionic silica component as compared to that produced by the prior-art methods.

Also, with the present invention, it is possible to provide pure (ultrapure) water in which practically no non-ionic silica component exists by a pure (ultrapure) water producing apparatus on an industrial scale, which has been impossible with the prior-art techniques.

Further, it should be noted, in particular, that the present invention makes it possible to remarkably reduce the amount of impurities in ultrapure water used for rinsing wafers, etc. Such impurities constitute a product-yield reducing factor in the field of semiconductor device manufacturing, in which the conditions for quality control are becoming more and more stringent.

In addition, the method and apparatus of this invention not only help remove the non-ionic silica component, but also bring about, due to the dissolving of ozone, solidification of inorganic particulates other than silica, thereby making it also easier to effect removal of particulates by membrane separation and, due to the use of ultraviolet rays, decomposition of organic matter in pure water.

What is claimed is:

1. An apparatus for producing pure water comprising:
   means for ionizing non-ionic silica which is contained in water comprising a vessel for allowing the water to pass therethrough and stay therein for predetermined lengths of time, a means for dissolving ozone in the water in this vessel, a means for irradiating the water in which ozone has been dissolved with ultraviolet rays, and a means for separating gases from liquids located between the means for dissolving ozone and the means for irradiating water; and
   means for fixing ionized silica in the water to a solid electrolyte by ion exchange.

2. An apparatus as claimed in claim 1 wherein the means for ionizing non-ionic silica and the means for fixing ionized silica to a solid electrolyte are provided in a primary pure water production system of ultrapure water producing equipment.

3. An apparatus as claimed in claim 2 wherein the primary pure water production system is a two-bed pure water producing apparatus comprising a cation exchange column filled with cation exchange resin, an anion exchange column filled with an anion exchange resin, an ozone reaction vessel which brings non-ionic silica into contact with ozone and which is provided between said cation exchange column and said anion exchange column, and an ultraviolet irradiation device which is provided between said cation exchange column and said anion exchange column and which serves as a means for ionizing non-ionic silica.

4. An apparatus as claimed in claim 3 further comprising a decarbonation column provided on the input side of the ozone reaction vessel.

5. An apparatus as claimed in claim 2 wherein the primary pure water production system is a two-bed ion exchange pure water producing apparatus comprising a cation exchange column filled with a cation exchange resin, an anion exchange column filled with an anion exchange resin, a decarbonation column using ozone as a deareation gas, which decarbonation column is provided between said cation exchange column and said anion exchange column, and an ultraviolet irradiation device which is provided between said cation exchange column and said anion exchange column and which serves as a means for ionizing the non-ionic silica.

6. An apparatus as claimed in claim 5 wherein the ultraviolet irradiation device is provided in a water storage vessel in the lower section of the decarbonation column.

7. An apparatus as claimed in claim 1 wherein the means for fixing ionized silica in the water to a solid electrolyte by ion exchange is ion exchange resin columns filled with ion exchange resins.

8. The apparatus of claim 1 wherein the means for dissolving ozone in the water includes an ejector, an atomizer, a turbine, or a mixer.

9. The apparatus of claim 1 wherein the solid electrolyte includes inorganic or organic ion exchangers.

10. The apparatus of claim 1 wherein the solid electrolyte includes beads, powder, or fibers.

11. The apparatus of claim 1 wherein the solid electrolyte includes a quaternary ammonium compound.

12. The apparatus of claim 11 wherein the said quaternary ammonium compound includes a copolymer of styrene and divinyl benzene.

13. An apparatus for producing pure water comprising:
   means for ionizing non-ionic silica which is contained in water comprising:
      a vessel for allowing the water to pass therethrough and stay therein for predetermined lengths of time;
      means for dissolving ozone in the water in this vessel;
      means for irradiating the water in which ozone has been dissolved with ultraviolet rays; and
      means for separating gases from liquids located between the means for dissolving ozone and the means for irradiating water;
   a multiple-bed ion exchange device comprising a cation exchange column, a decarbonation column, and an anion exchange column; and
   means for fixing ionized silica in the water to a solid electrolyte in the anion exchange column.

14. The apparatus of claim 13 wherein the decarbonation column is located between the cation exchange column and the anion exchange column.

15. The apparatus of claim 13 wherein the decarbonation column is filled with filler material of Raschig rings or tellerette packings.

* * * * *